Dec. 22, 1959 R. S. HINES 2,917,861
FISHING SINKER
Filed May 24, 1957
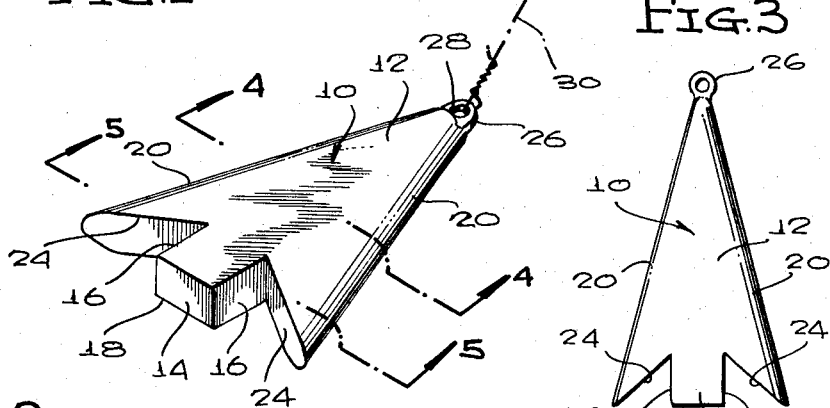
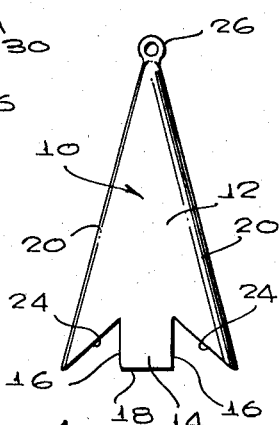
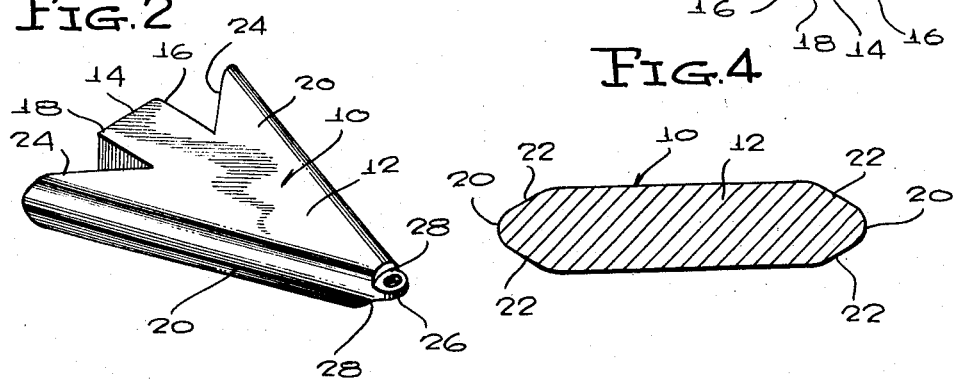
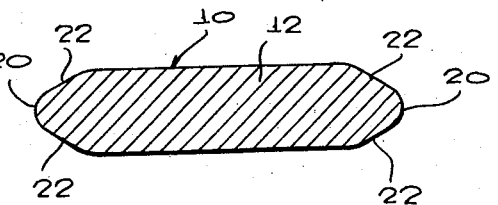
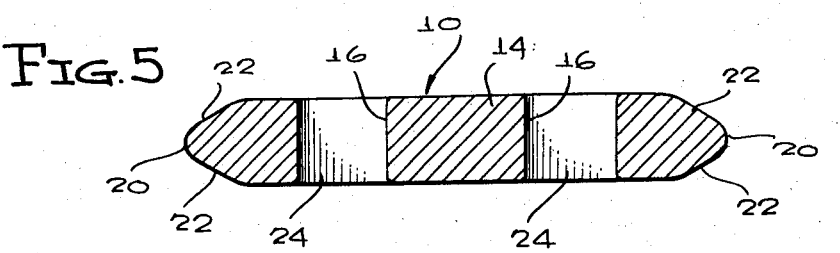
INVENTOR.
ROBERT S. HINES
BY
McMorrow, Berman & Davidson
ATTORNEYS

United States Patent Office 2,917,861
Patented Dec. 22, 1959

2,917,861

FISHING SINKER

Robert S. Hines, Sacramento, Calif.

Application May 24, 1957, Serial No. 661,524

2 Claims. (Cl. 43—44.96)

This invention relates to sinkers, and more particularly has reference to an improved sinker, having a shape especially designed to permit an effective action of the sinker when the same is in use, said shape further having the desirable characteristic of insuring against the fouling of the sinker on an underwater obstruction.

Considerable difficulty is experienced, in the use of sinkers of ordinary shapes. For example, sinkers will tend, when used in bottom fishing, to slip down stream under the force of the current. It is desirable in such instances that the sinker be so formed as to remain at the location at which it is dropped, that is, the sinker should be shaped in such a manner as to insure that it will cling to the bottom.

It is further desirable to provide a sinker that will be designed to offer minimum resistance to the water, when the same is pulled upwardly with the rapid motion that is desirable when a fish strikes.

Still further, the sinker should be so designed as to not spin, oscillate, or have other erratic action that fails to produce maximum results during fishing.

It is the main object of the present invention to provide a sinker that will have a shape such that it will have none of the undesirable characteristics indicated above which have been found to be present in conventional sinkers. Another important object is to provide a sinker that will be designed to trail easily, without spinning or oscillating, and without hampering the fish when the fish is being played.

Another object is to provide a sinker that will be so designed as to be adapted to be reeled in smoothly and easily, with the sinker being so designed as to rise slowly with a steady, unwavering motion.

Still another object is to form a sinker in such a manner that it will not hang or foul upon submerged objects, and that will, in addition, be possessed with the characteristics of easy and accurate casting.

A further object is to form a winged sinker, so designed as to permit the sinker to be properly balanced, and to be held against accidental inversion or reversal of position, when used in fast water.

Yet another object is to provide a sinker, having angularly related, symmetrically arranged, rounded surfaces extending at such an angle to a line perpendicular to the longitudinal median of the body as to insure to the maximum extent against fouling of the sinker on any objects that it might encounter, such as rock piles, tree limbs, loose wire, etc.

A further object is to achieve the several desirable results noted above, while still permitting manufacture of the sinker at a minimum cost.

Other objects will appear from the following description, the claims appended thereto, and from the annexed drawing, in which like reference characters designate like parts throughout the several views, and wherein:

Figure 1 is a perspective view of a sinker according to the present invention, as seen from a point disposed rearwardly, laterally of the sinker;

Figure 2 is a front perspective view of the sinker;

Figure 3 is a slightly reduced top plan view thereof;

Figure 4 is an enlarged transverse sectional view substantially on line 4—4 of Figure 1; and Figure 5 is a transverse sectional view, on the same scale of Figure 4, taken substantially on line 5—5 of Figure 1.

Referring to the drawing in detail, designated generally at 10 is a sinker according to the present invention. The sinker is formed from a single piece of heavy material, such as cast lead. As shown to particular advantage in Figures 4 and 5, the sinker comprises a body 12 which is of symmetrical isosceles-triangular configuration, said body having flat, parallel opposed faces.

The body 12, at its trailing end, is formed medially between opposite sides thereof with a rearwardly projecting stem 14 of rectangular cross section (see Figure 5). The stem 14 may appropriately be alternatively termed a head, and the purpose thereof is to provide balance and to keep the sinker from turning over rearwardly in fast moving water.

The opposite side surfaces 16 of the stem or head 14 are flat, and are disposed in parallel planes perpendicular to the planes of the flat, opposite faces of the body 12. The opposite faces of the stem 14 are coplanar with the respective faces of the body 12, and the rear-end surface 18 of the stem 14 is cut off squarely, in a plane perpendicular to the planes of the side surfaces 16, and also perpendicular to the planes of the opposite faces of the body 12.

The opposite side edges 20 of the body 12 diverge in a direction rearwardly from the leading end of the body, and are symmetrically disposed in respect to the longitudinal median of the body. The edges 20 are straight from end to end, and at their rear, diverging ends terminate in transverse alignment with the rear-end surface 18, that is, the rear extremities of the edges 20 fall in the plane of said end surface 18.

Referring now to Figures 4 and 5, it will be noted that medially between the planes of the opposite faces of the body of the sinker, the edges 20 are transversely rounded, being bowed outwardly and being curved through approximately ninety degrees. At opposite sides of the rounded, midwidth portions of the edges 20, said edges have flat surfaces 22 which diverge in a direction away from the transversely rounded portions or midwidth areas of the edges, in a direction towards the opposite, planar flat faces of body 12.

Referring to Figure 3, extending from the rear extremities of the edges 20 to the inner extremities of the side surfaces 16 of stem 14 are straight surfaces 24. The arrangement results in the provision of deep notches or recesses at opposite sides of the stem 14, found to produce a particularly effective action, in coactive relationship with the remaining components of the device.

At its leading end, the body 12 is formed with means for connecting a line to the sinker, in the form of a flat, rounded, forwardly projecting lug 26, having an aperture. The lug 26 is of reduced thickness, defining angular notches 28 above and below the same, and connected to the lug is the leader or line 30.

It has been found that in use, the sinker has a particularly effective action. The deep recessing of the sinker at opposite sides of the stem 14, producing flat surfaces 24, has the effect of preventing slippage of the sinker on the bottom, since the material of the bottom of the stream or lake tends to work into the area between the surfaces 16, 24. Thus, when the sinker is lowered into a fast moving stream, it will tend to move about so that the pointed end thereof is directed upstream. As a result, when the sinker reaches bottom, the wider, deeply recessed end will be facing downstream, and will engage in the bottom of the body of water, in a manner such as to prevent slippage of the sinker from its initial position.

At the same time, the sinker has other important desirable characteristics. A minimum resistance to movement of the sinker upwardly within the water is achieved, and in addition, the sinker tends to be completely stabilized when in use, so as not to oscillate or have other undesirable erratic movements. Still further, the sinker has the adaptability of reducing to a minimum the possibility of its becoming fouled or snagged on obstructions, both submerged and exposed. This is by reason of the fact that at opposite sides of the line 30, the sinker has the edges 20, the angularity of which to the longitudinal median is carefully selected. In practice, it has been found that each edge 20 should be approximately seventy-six degrees to the plane of the end surface 18, that is, seventy-six degrees to a line perpendicular to the longitudinal center line of the body of the sinker.

It has been further found that the particular cross sectional shape of the sinker, at the opposite side edges thereof, shown to particular advantage in Figures 4 and 5 has the desirable characteristic of ensuring against fouling of the sinker on objects, while also stabilizing the sinker and streamlining the same during its movement through the water.

In this connection, at such time as the sinker might snag, it has been found that when the point thereof comes in contact with two objects, one being on each side of the point, by means of a slight pull on the line the sinker easily turns edgewise and comes through the space between the objects, or "climbs" edgewise over the objects.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A sinker comprising a forwardly tapering, symmetrically shaped body having an apex end constituting the leading end thereof, the body including at said apex end means for connecting a line thereto, said body being formed with the flat, parallel faces and with smooth, opposite longitudinal edge surfaces adapted to move free of obstructions engaging the sinker, each edge surface having a transversely curved midwidth area merging into flat side areas of the edge surface, the other end of the body constituting a trailing end, the body of the sinker being formed at said trailing end thereof with deep recesses formed in its rear end surface, each recess opening upon both of said faces and in addition opening rearwardly, said recesses being disposed at opposite sides of the longitudinal median of the sinker body, providing open spaces in which may engage the material of the bottom of a body of water, said body of the sinker being formed, at said trailing end thereof, with a rearwardly projecting stem disposed between said recesses and symmetrically disposed in respect to the longitudinal median of the sinker.

2. A sinker comprising a generally flat, thick body one end of which is a leading end, the body having at its other end a trailing end surface, said body having means at said one end thereof for connecting a line thereto, the body being formed with straight longitudinal edges diverging rearwardly from said means in symmetrical relation to the longitudinal median of the body, said body being formed in its trailing end surface with rearwardly opening, deep, acute-angular recesses, and with a rearwardly projecting stem disposed between the recesses, the stem having opposite side surfaces forming inner side walls of the recesses, each recess extending over the full thickness of the body and opening, over its full depth and width, upon the opposite faces of the body.

References Cited in the file of this patent
UNITED STATES PATENTS

| | | |
|---|---|---|
| 2,033,683 | Clark | Mar. 10, 1936 |
| 2,070,514 | Marlow | Feb. 9, 1937 |
| 2,106,045 | Zamborsky | Jan. 18, 1938 |
| 2,187,991 | Tyler | Jan. 23, 1940 |
| 2,577,549 | Vice | Dec. 4, 1951 |
| 2,644,266 | Updegrove | July 7, 1953 |
| 2,651,136 | Kruze | Sept. 8, 1953 |